United States Patent
Tian et al.

(10) Patent No.: US 9,350,991 B2
(45) Date of Patent: May 24, 2016

(54) COMMUNICATION SYSTEM WITH COMPRESSIVE SENSING

(71) Applicant: Futurewei Technologies, Inc., Plano, TX (US)

(72) Inventors: Jun Tian, Belle Mead, NJ (US); Yu Huang, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/323,733

(22) Filed: Jul. 3, 2014

(65) Prior Publication Data

US 2014/0321763 A1    Oct. 30, 2014

Related U.S. Application Data

(62) Division of application No. 12/603,470, filed on Oct. 21, 2009, now Pat. No. 8,855,190.

(51) Int. Cl.
| | |
|---|---|
| *H04N 7/12* | (2006.01) |
| *H04N 19/44* | (2014.01) |
| *H04N 19/63* | (2014.01) |
| *H04N 19/90* | (2014.01) |
| *H04N 19/61* | (2014.01) |
| *H04N 19/97* | (2014.01) |
| *H04N 19/102* | (2014.01) |
| *H04N 19/64* | (2014.01) |
| *H04N 19/132* | (2014.01) |

(52) U.S. Cl.
CPC ..... *H04N 19/00533* (2013.01); *H04N 7/26563* (2013.01); *H04N 7/26994* (2013.01); *H04N 7/50* (2013.01); *H04N 19/44* (2014.11); *H04N 19/61* (2014.11); *H04N 19/63* (2014.11); *H04N 19/97* (2014.11); *H04N 7/26111* (2013.01); *H04N 19/132* (2014.11); *H04N 19/647* (2014.11); *H04N 19/99* (2014.11)

(58) Field of Classification Search
CPC . H04N 7/50; H04N 7/26563; H04N 7/26994; H04N 7/26111
USPC .............. 375/240.01, 240.19, 240.18, 240.02; 382/249, 235, 233
See application file for complete search history.

(56) References Cited

U.S. PATENT DOCUMENTS

| | | | | | |
|---|---|---|---|---|---|
| 5,412,741 | A | * | 5/1995 | Shapiro | H03M 7/30 358/1.9 |
| 5,808,683 | A | * | 9/1998 | Tong | G06T 9/40 375/240.11 |
| 5,850,482 | A | * | 12/1998 | Meany | H04N 19/65 382/232 |

(Continued)

OTHER PUBLICATIONS

Ramchandran, K., et al., "An Investigation of Wavelet-Based Image Coding Using an Entropy-Constrained Quantization Framework", IEEE Transactions on Signal Processing, vol. 46,k No. 2, Feb. 1998, pp. 342-353.

(Continued)

*Primary Examiner* — Shawn An
(74) *Attorney, Agent, or Firm* — Slater Matsil, LLP

(57) ABSTRACT

Systems and methods for communication systems with compressive sensing are disclosed. In one embodiment, a method of signal processing includes receiving a data packet at a processor. The data packet includes compressively measured data in wavelet transform coefficients of a signal. The signal is reconstructed using a clustering property of the wavelet transform coefficients.

18 Claims, 5 Drawing Sheets

(56) References Cited

U.S. PATENT DOCUMENTS

| | | | |
|---|---|---|---|
| 6,480,615 B1* | 11/2002 | Sun ................... | G06T 7/2006 382/103 |
| 7,006,088 B1 | 2/2006 | Guskov et al. | |
| 7,508,325 B2* | 3/2009 | Monro ................ | H03M 7/30 341/50 |
| 7,555,691 B2* | 6/2009 | Gilbert ................ | H03M 7/30 708/530 |
| 7,813,573 B2 | 10/2010 | Monro | |
| 7,848,584 B2* | 12/2010 | Monro ................ | H04N 19/63 382/239 |
| 2005/0286741 A1* | 12/2005 | Watanabe .......... | H04N 19/63 382/107 |
| 2007/0118285 A1* | 5/2007 | Baryshnikov ...... | G01S 5/0289 701/469 |
| 2008/0037880 A1 | 2/2008 | Lai | |
| 2009/0067735 A1 | 3/2009 | Mignet et al. | |

OTHER PUBLICATIONS

Donoho, D.L., "Compressed Sensing", IEEE Transactios on Information Theory, vol. 52, No. 4, Apr. 2006, pp. 1289-1306.

Baraniuk, R.G., "Compressive Sensing", IEEE Signal Processing Magazine, Jul. 2007, pp. 118-120, 124.

Chartrand, R., "Exact reconstruction of sparse signals via nonconvex minimization", Los Alamos National Laboratory, EDICS: DSP-TFSR, pp. 1-4.

Duarte, M. F., et al., "Fast Reconstruction of Piecewise Smooth Signals from Random Projections," Online Proceedings of the Workshop on Signal Processing with Adaptative Sparse Structured Representations (SPARS), 2005, pp. 1-4.

Figueiredo, M.A.T., et al., "Gradient Projection for Sparse Reconstruction: Application to Compressed Sensing and Other Inverse Problems", IEEE Journal of Selected Topics in Signal Processing, vol. 1, No. 4, Dec. 2007, pp. 586-597.

Blumensath, T., et al., "Gradient Pursuits", IEEE Transactions on Signal Processing, vol. 56, No. 6, Jun. 2008, pp. 2370-2382.

International Search Report received in Application No. PCT/CN/2010/077939, Applicant: Huawei Technologies Co., Ltd., Feb. 3, 2011, 9 pages.

Candès, E.J., et al., "Robust Uncertainty Principles: Exact Signal Reconstruction from HighlyIncomplete Frequency Information", IEEE Transactions o nInformation Theory, vol. 52, No. 2, Feb. 2006, pp. 489-509.

La, C., et al., "Signal Reconstruction using Sparse Tree Representations", SPIE Wavelets XI, San Diego, California, Sep. 2005, 11 pages.

Tropp, J.A., et al., "Signal Recovery From Random Measurements Via Orthogonal Matching Pursuit", IEEE Transactions on Information Theory, vol. 53, No. 12, Dec. 2007, pp. 4655-4666.

Donoho, D.L., et al., "Sparse Solution of Underdetermined Linear Equations by Stagewise Orthogonal Matching Pursuit", Mar. 2006, pp. 1-39.

Crouse, M.S., et al., "Wavelet-Based Statistical Signal Processing Using Hidden Markov Models", IEEE Transactions on Signal Processing, vol. 46, No. 4, Apr. 1998, pp. 886-902.

* cited by examiner

COMMUNICATION SYSTEM WITH COMPRESSIVE SENSING

PRIORITY CLAIM AND CROSS-REFERENCE

This application is a divisional of, and claims priority to, U.S. patent application Ser. No. 12/603,470, filed on Oct. 21, 2009 and entitled "Communication System with Compressive Sensing," which application is incorporated herein by reference.

TECHNICAL FIELD

The present invention relates generally to compressive sensing, and more particularly to communication with compressive sensing.

BACKGROUND

A signal is a physical phenomenon distributed over space and/or time. Examples include signals distributed over time, such as electromagnetic waves on antennas or transmission lines; signals distributed over Fourier space, such as optical or electrical spectra; and multidimensional signals distributed over physical space, such as 2 D and 3 D images.

In digital signal analysis, a signal is reconstructed from discrete measurements. For many years, sampling theory formed the theoretical core of signal analysis. Conventional approaches to sampling signals or images follow Shannon's celebrated theorem that the sampling rate must be at least twice the maximum frequency present in the signal. This minimal sampling rate is termed the Nyquist rate or frequency. In fact, this principle underlies nearly all signal acquisition protocols used in consumer audio and visual electronics, medical imaging devices, radio receivers, etc. In the field of data conversion for example, standard analog-to-digital converter (ADC) technology implements the quantized Shannon representation that the signal is uniformly sampled at or above the Nyquist rate.

In many applications, including digital image and video cameras, the Nyquist rate is so high that too many samples result, making compression a necessity prior to storage or transmission. In other applications, including imaging systems (medical scanners and radars) and high-speed analog-to-digital converters, increasing the sampling rate is very expensive.

Recent developments have shown that compressive sampling or compressive sensing can provide sub-Nyquist rate sampling. However, a number of challenges exist in implementing such sampling algorithms and reconstructing the original signal without a significant loss of data. These and other limitations are overcome in embodiments of the invention described herein.

SUMMARY OF THE INVENTION

These and other problems are generally solved or circumvented, and technical advantages are generally achieved, by illustrative embodiments of the present invention.

In accordance with an embodiment of the present invention, a method of signal processing, the method comprises receiving a data packet at a processor, the data packet comprising compressively measured data of a signal. The compressively measured data comprises wavelet transform coefficients. The method further comprises reconstructing the signal using a clustering property of the wavelet transform coefficients at the processor.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
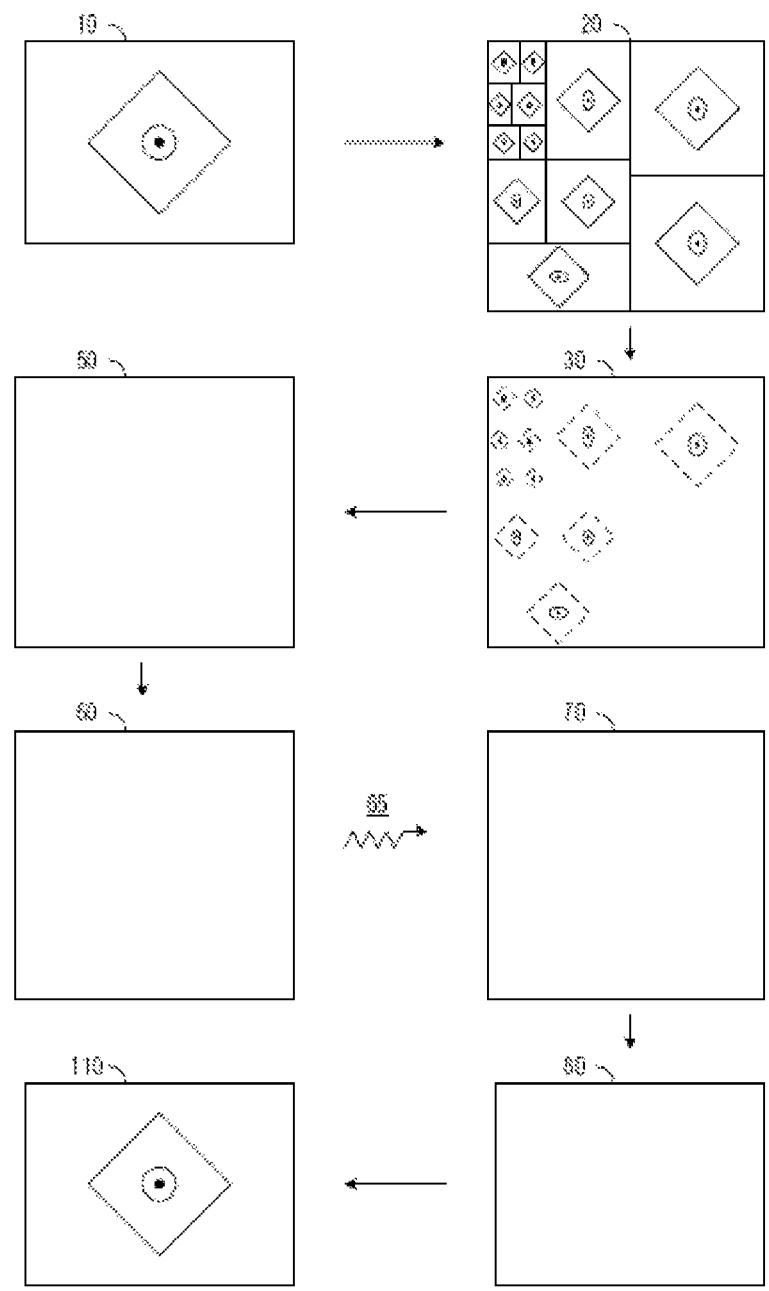
FIG. 1 illustrates a communications system using compressive sensing, in accordance with embodiments of the invention.

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, namely to communications systems with compressive sensing of data using wavelet transform. The invention may also be applied, however, to any type of domain in which the data can be compressively sampled.

Compressive sampling is a digital signal processing that enables high resolution capture of physical signals from relatively few measurements, which is typically well below the number expected from the requirements of the Shannon/Nyquist sampling theorem. Compressive sampling uses two key ideas. First, sparse representation is used through an informed choice of linear basis for the class of signals under study. Second, incoherent (e.g., pseudorandom) measurements of the signal are used to extract the maximum amount of information from the signal using a minimum amount of measurements. However, a number of techniques and innovations are required to implement compressive sampling. Examples include use of linear bases (e.g., wavelet, curvelet, etc.), optimization to recover sparse representations, and design of optimal dual measurements.

According to the compressive sensing theory, a sparse (or compressible) signal can be perfectly reconstructed from O(N log(m)) non-adaptive measurements, where m is the signal dimension, N is the signal sparsity.

A key problem of compressive sensing is to design a robust and efficient algorithm that reconstructs the original signal from the measurements. It looks like an ill-poised problem, as the number of unknowns m, is much larger than the number of measurements O(N log(m)). In theory, recovery methods using compressive sampling techniques such as basis pursuit, gradient project, gradient pursuit, nonconvex projection, and orthogonal matching pursuit, etc. can perfectly reconstruct the signal. However, in practice, they are not suitable for commercial applications due to the extended computational time required. In practice, programs using conventional compressive sampling techniques are not robust and efficient for sparse signal recovery because the solution vector is sparse and the measurement matrix is typically dense.

While the conventional compressive sampling techniques use the idea of sparseness or compressibility, the signal under examination may exhibit other properties that may be used to design a more efficient and robust recovery method for compressive sensing. Embodiments of the invention advantageously use these properties to design practical compressive sensing methods. For example, in the wavelet domain, wavelet transform coefficients of an image are not totally independent. Hence, the correlation of wavelet transform coefficients may be used to achieve a more robust and efficient signal reconstruction for compressive sensing.

In various embodiments, a robust and efficient recovery method for compressive sensing in the wavelet domain is described. In various embodiments, the clustering property of wavelet transform coefficients is used to achieve a robust and efficient signal recovery. In wavelet domain, the signal energy of a digital signal is concentrated into a few large wavelet transform coefficients. The statistical dependence at neighboring spatial locations at the same sub-band in the wavelet domain is referred to as the clustering property. Hence, due to clustering if a particular wavelet transform coefficient is large, then wavelet transform adjacent coefficients are very likely to also be large.

In various embodiments, a system using compressive sensing will be described using FIGS. 1 and 2, and a method of using the system will be described in FIG. 3. An embodiment of compressive sampling will be described in FIG. 4, whereas an embodiment of reconstructing the sampled data will be described in FIG. 5.

FIG. 1 illustrates a communications system using compressive sensing, in accordance with embodiments of the invention.

Data 10 to be transmitted is dynamically transformed into a sparse domain such as a wavelet domain. The data 10 can comprise among others natural images such as data in pixel domain, medical images, video, audio, etc. For illustration, FIG. 1 shows two-dimensional data, while in various embodiments, the data 10 may comprise any dimensionality. For example, embodiments may include data 10 of one dimension such as audio data. Similarly, other embodiments may include data 10 of three or higher dimensions. If the data 10 comprises natural images, it is well known that Discrete Cosine Transform and wavelet transform can transform the natural image into a vector of sparse coefficients. Hence, the data 10 is first transformed into a wavelet domain data 20 using a wavelet transform showing multiple sub-bands. Many different types of wavelet transforms may be used. Examples of wavelet transforms include fast wavelet transform (FWT), wavelet packet decomposition (WPD), etc. A single application will typically, but not necessarily, use only one of these transformations.

The wavelet transform is a multi-scale representation of the data 10 and comprises coarse-scale and fine-scale wavelet coefficients. The coarse-scale wavelet coefficients represent the low resolution image components whereas the fine-scale wavelet coefficients represent high resolution components. Each wavelet coefficient carries both spatial position and spatial frequency information at the same time. Due to the wavelet transform, the wavelet domain data 20 is sparse. Again, the wavelet domain data 20 may comprise any dimension, while two-dimensional wavelet domain data 20 is shown in FIG. 1 as an illustration. The use of the wavelet transform enables the application of compressive sensing to data that is not inherently sparse. For example, many images such as natural and medical images may not be sparse in the pixel domain, but exhibit sparsity in the wavelet domain. The wavelet domain data 20 thus exhibits sparsity.

The sparse data in the wavelet domain is incoherently undersampled (violating the Nyqist criterion) using embodiments of the invention described herein. An undersampled wavelet data 30 is thus formed. This undersampled wavelet data 30 is stored in the memory of a first user end device 50. The first user end device 50 could be a hard drive or a flash drive in a hand held device or a computer.

The undersampled wavelet data 30 is transported through a first network gateway server 60 through a wired or wireless network 65 to a second network gateway server 70. The first and the second network gateway servers 60 and 70 may comprise routers, network servers, gateway servers, and/or any suitable equipment used in the transport of wired or wireless communication. Advantageously, the transmission of compressed data uses less bandwidth of the internet infrastructure allowing more data to be transferred using fewer resources.

The operations of converting the data 10 into undersampled wavelet domain data 30 may be performed dynamically using a single device such as a digital camera described below or using any other suitable combination of devices.

The undersampled wavelet data 30 is transported to a second user end device 80. The second user end device 80 could be a hand held device or a computer. Using embodiments of the invention described below, the second user end device 80 reconstructs the image in the wavelet domain to form a reconstructed wavelet domain data that closely matches the wavelet domain data 20. An inverse wavelet transform is performed to obtain the reconstructed data 110 which is almost identical to the data 10. Unlike lossy compression schemes such as JPEG, the difference between the reconstructed data 110 and the data 10 is minimal. Thus, the embodiment of the invention enables near perfect reconstruction of the data 10, which is conventionally possible only by sending raw data files which consume tremendous internet bandwidth. Unlike conventional methods, the near perfect reconstruction of the data 10 is achieved without severely constraining internet resources.

Information regarding the undersampling may also be transported from the first user end device 50 to second user end device 80. This information may, for example, be transported as a codebook or known a-priori to the second user end device 80 based on an agreed protocol.

In some embodiments, the reconstruction may be performed in a different processor, and then the reconstructed wavelet domain data is transported to the second user end device 80. This may be advantageous if the reconstruction requires heavy computation. In various embodiments, the reconstruction may be implemented in handheld devices, personal computers, servers, network servers in communication systems, etc.

Figure 2:
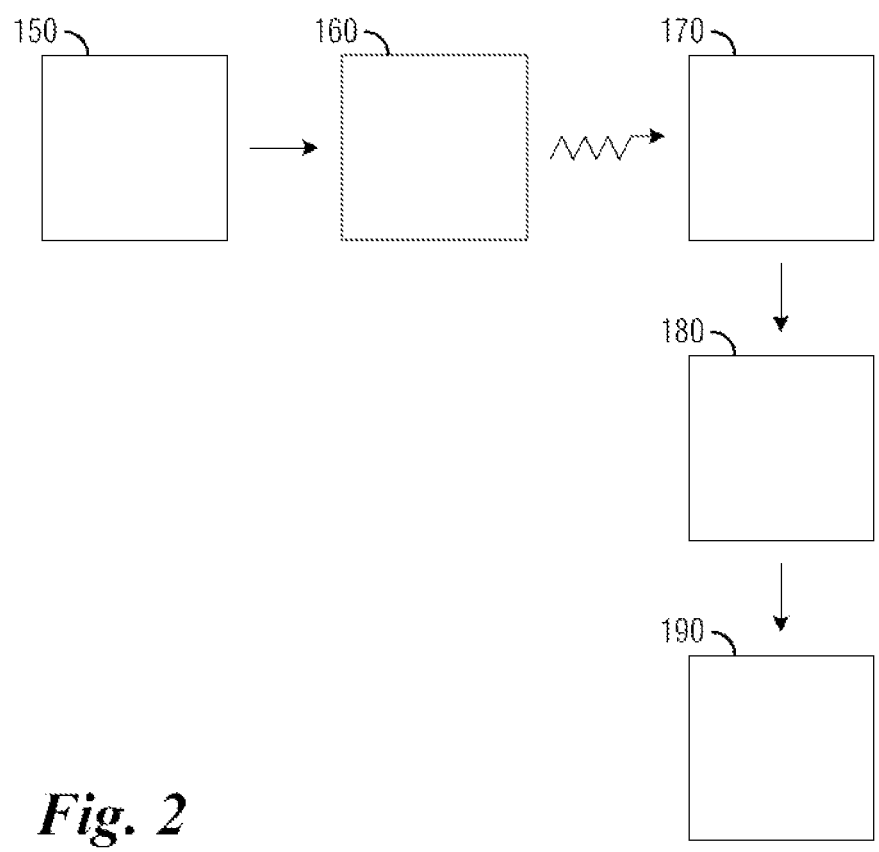
FIG. 2 illustrates a communications system using compressive sensing, in accordance with embodiments of the invention.

FIG. 2 illustrates a communications system using compressive sensing, in accordance with embodiments of the invention.

Referring to FIG. 2, a first storage device 150 is a central repository or a repository on the cloud (internet) that includes a plurality of compressively measured data. The first storage device 150 is connected to a first network gateway server 160 that is activated in response to a user request for particular compressively measured data. The first storage device 150 transfers the requested compressively measured data to the first network gateway server 160 which relays it to a second network gateway server 170 connected to a user end device 180. The second network gateway server 170 may be a router in a wired or wireless communications system. Examples of wireless communications systems include cell based wireless systems as well as satellite based systems. The user end device 180 may be computer, a hand held device, a digital video receiver, or a similar device capable of reconstructing the compressively measured data. The user end device 180 reconstructs the original data 110 from the compressively measured data and displays it to an output device 190 such as a monitor, a television screen, a projector, a speaker, etc. In some embodiments, the compressively measured data may be stored in the user end device 180 until an output request is made by the user.

Figure 3:
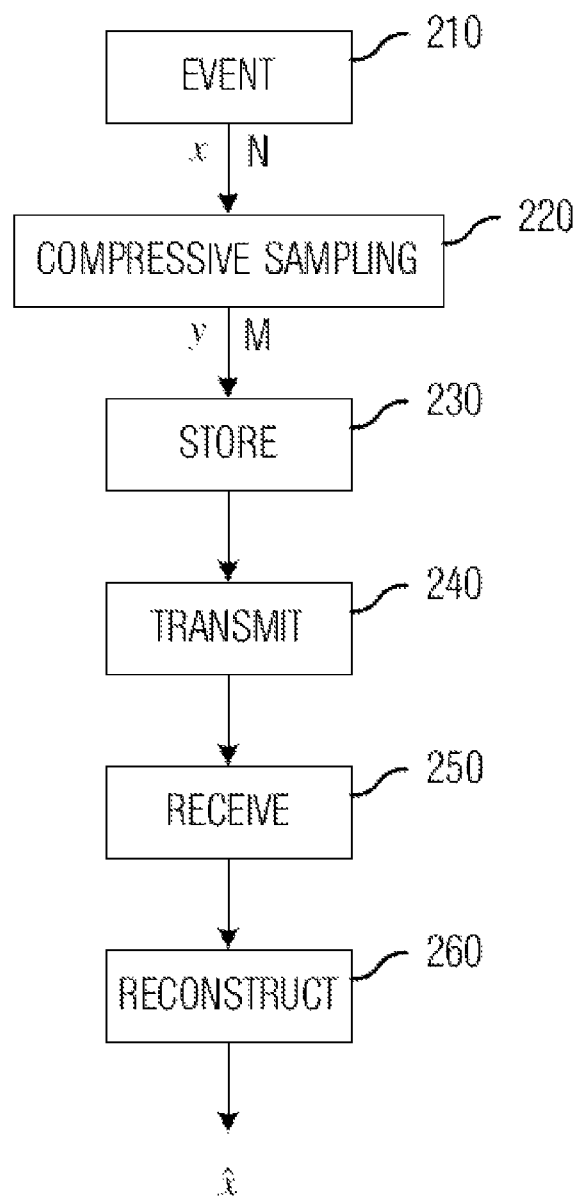
FIG. 3 illustrates a method of communication using compressive sensing, in accordance with embodiments of the invention.

FIG. 3 illustrates a method of communication using compressive sensing, in accordance with embodiments of the invention.

Referring to FIG. 3, a signal producing event 210 produces a discrete signal x. As one example, the event may be a real time event to be captured as a still image in a camera. The discrete signal x may be an image in pixel domain. In other embodiments, the discrete signal x may be any other form of data including audio and/or video content, medical imaging output including output from techniques such as magnetic resonance imaging, as well as audio/video communications, etc.

The camera dynamically acquires an undersampled image of the discrete signal x of length N using compressive measurement (box 220). In other words, the camera acquires M random measurements without collecting the pixel intensity values which requires sampling at least N values (M<N).

In one embodiment, the camera comprises an optical imaging mechanism having a digital micro-mirror display device consisting of an array of N tiny mirrors. The mirrors of the micro-mirror display device are independently oriented and rotated to either allow an image to form on the photo sensor of the camera or block an image from forming on the photo sensor. A random number generator orients the micro-mirrors with a pseudorandom 1/0 pattern to create a measurement vector. The voltage at the photodiode is the inner product between the measurement vector and the discrete signal x. The above steps are repeated M times to obtain a measurement vector y, which is the undersampled representation of the event x.

While a camera is used as an illustration of the compressive sensing measurement, in various embodiments, any other suitable technique may be used. Examples include magnetic resonance imaging, audio-video representation and coding, etc.

Referring back to FIG. 3, the measurements are stored (box 230) and/or transmitted (box 240) through wired or wireless medium to a destination address. As shown in box 250, the transmitted measurement of length M is received at the destination and processed to reconstruct (box 260) the approximate discrete signal $\hat{x}$.

In various embodiments, the reconstruction uses a clustering property of the wavelet coefficients as will be described in detail below. In particular, in various embodiments, wavelet transform coefficients that are larger than a certain weighted threshold are included in the orthogonal matching pursuit algorithm as described below in reconstructing the received signal. Although M<N, using embodiments of the invention, the approximate discrete signal $\hat{x}$ is almost perfectly identical to the discrete signal x.

Embodiments of the reconstruction method are implemented in suitable hardware which may include a processor and may be part of a central processor unit of a computer. The reconstruction may also be implemented in handheld devices such as smart phones, tablet PCs, cell phones etc. having a suitable processor such as a digital signal processor. Alternatively, the reconstruction method is implemented in servers such as network servers in communication systems.

However, in some embodiments, the compressed measurement could be stored locally and then retrieved. Such embodiments could be used to store information in a computer drive, or in storage devices including digital video receivers (DVR), or other types of storage devices such as optical storage devices. The ability to store data in compressed form and reconstruction using embodiments described herein allow accurate reconstruction of the original data while occupying minimum storage resources.

The compressive sensing method is presented in more detail for improved clarity.

Consider a real-valued, finite-length, one-dimensional, discrete-time signal x, which can be viewed as an N×1 column vector in $R^N$ with elements x[n], n=1, 2, ..., N. For example, an image or higher-dimensional data is vectorized into a long one-dimensional vector. Any signal in $R^N$ can be represented in terms of a basis of N×1 vectors $(\psi)_{i=1}^N$. For simplicity, assume that the basis is orthonormal. Using the N×N basis matrix $\psi=[\psi_1|\psi_2|\ldots|\psi_N]$ with the vectors $\{\psi_i\}$ as columns, a signal x can be expressed as $$x = \sum_{i=1}^{N} s_i$$

$\psi_i$ or x=$\psi$s (hereinafter, "equation (1)"), wherein s is an N×1 column vector of weighting coefficients $s_i=\langle x,\psi i\rangle =\psi_i^T x$, wherein $^T$ denotes the transpose. Hence, in the representation, s and x are equivalent representations of the signal and related through the transformation. In particular, x is the signal in time or space while x is in the $\psi$ space.

The signal x is K-sparse if it is a linear combination of only K basis vectors. Hence, only K of the $s_i$ coefficients in equation (1) are nonzero and (N−K) are zero. The signal x is compressible if the representation in equation (1) has just a few large $s_i$ coefficients and many small $s_i$ coefficients.

Compressible signals are well approximated by K-sparse representations. This is used in data acquisition systems (for example, digital cameras) as transform coding. The full N-sample signal x is first acquired. The complete set of transform coefficients $\{s_i\}$ is computed via s=$\psi_T$x. The K largest coefficients are located while the (N—K) smallest coefficients are discarded. Subsequently, the K values and locations of these largest coefficients are encoded. Unfortunately, this sample first, compress second framework suffers from three inherent inefficiencies. First, the initial number of samples N may be large even if the desired K is small. Second, the set of all N transform coefficients $\{s_i\}$ must be computed even though all but K of them will be discarded. Third, the locations of the large coefficients must be encoded, thus introducing an overhead.

Compressive sensing addresses these inefficiencies by directly acquiring a compressed signal representation without going through the intermediate stage of acquiring N samples. Hence, in compressive sampling the real signal itself is recorded in compressed form on the fly avoiding the necessity to first capture the signal at full resolution and high data rate and then compressing the full signal.

The measurement is performed in the form of the inner products of the signal with measurement vectors $y_j$. The measurement vectors are carefully designed to extract the maximum amount of information from a generically sparse vector in the given basis system. Consider a general linear measurement process that computes M<N inner products between x and a collection of vectors $\{\phi_j\}_{j=1}^{M}$ as in $y_j = \langle x, \phi_j \rangle$. Arrange the measurements $y_j$ in an M×1 vector y and the measurement vectors as rows in an M×N matrix $\phi$. Then, by substituting $\psi$ from equation (1), y can be written as $y=\phi x=\phi\psi s=\theta s$, referred hereinafter as equation (2). In equation (2), $\theta=\phi\psi$ is an M×N matrix. The measurement process is not adaptive, meaning that $\phi$ is fixed and does not depend on the signal x. Hence, the compressive sensing problem reduces to designing a stable measurement matrix $\phi$ such that the salient information in any K-sparse or compressible signal is not damaged by the dimensionality reduction from $x \in R^N$ to $y \in R^M$. Further, a reconstruction algorithm is required to recover x from only M measurements y.

The measurement matrix $\phi$ must allow the reconstruction of the length-N signal x from M<N measurements (the vector y). Since M<N, this problem appears ill-conditioned. If, however, x is K-sparse and the K locations of the nonzero coefficients in s are known, then the problem can be solved provided M≥K. A necessary and sufficient condition for this simplified problem to be well conditioned is that, for any vector v sharing the same K nonzero entries as s and for some constant $\epsilon$ greater than zero, the matrix $\theta$ must preserve the lengths of these particular K-sparse vectors. Alternatively, the condition also known as restricted isometry property (RIP) requires that $$1 - \varepsilon \leq \frac{\|\theta v\|_2}{\|v\|_2} \leq 1 + \varepsilon.$$

The locations of the K nonzero entries in s are generally not known. Despite this, satisfying the above condition is sufficient for a stable solution for both K-sparse and compressible signals.

A related condition, referred to as incoherence, requires that the rows $\{\phi_j\}$ of $\phi$ cannot sparsely represent the columns $\{\psi_i\}$ of $\psi$ (and vice versa). Direct construction of a measurement matrix $\phi$ such that $\theta=\phi\psi$ has the RIP requires verifying the above inequality is satisfied for each of the possible combinations of the K nonzero entries in the vector v of length N. However, both the RIP and incoherence can be achieved with high probability simply by selecting the measurement matrix $\phi$ as a random matrix. For instance, let the matrix elements $\phi_{j,i}$ be independent and identically distributed (i.i.d.) random variables from a Gaussian probability density function with mean zero and variance 1/N. Then the measurements y are merely M different randomly weighted linear combinations of the elements of x. The Gaussian measurement matrix $\phi$ has two interesting and useful properties.

The measurement matrix $\phi$ has the sufficient RIP even if the basis $\psi$ is not orthonormal. The measurement matrix $\phi$ is further incoherent with the basis $\psi=I$ of delta spikes with high probability. More specifically, an M×N i.i.d. Gaussian matrix $\theta=\phi\psi=\phi I=\phi$ has the RIP if M≥cK log(N/K), wherein c is a small constant. Hence, K-sparse and compressible signals of length N can be recovered from only M≥cK log(N/K)<<N random Gaussian measurements.

The signal reconstruction algorithm must take the M measurements in the vector y, the random measurement matrix $\phi$ (or the random seed that generates the measurement matrix $\phi$), and the basis $\psi$ and reconstruct the length-N signal x or, equivalently, its sparse coefficient vector s. For K-sparse signals, since M<N in equation (2) there are infinitely many s that satisfy $\theta s'=y$. This is because if $\theta s=y$ then $\theta(s+t)=y$ for any vector t in the null space $N(\theta)$ of $\theta$. Therefore, the signal reconstruction algorithm aims to find the signal's sparse coefficient vector in the (N−M)-dimensional translated null space $H=N(\theta)+s$.

In various embodiments, the signal reconstruction algorithm may use either a L1, L2, or L0 minimum norm reconstruction. The $l_p$ norm of the vector s is defined as $(\|s\|_p)^p = \Sigma_{i=1}^{N}|s_i|^p$. The inverse problem is solved by finding the vector in the translated null space with the smallest $l_p$ norm. This requires solving $\hat{s}=\arg\min\|s'\|_p$ such that $\theta s'=y$.

For example, L0 norm reconstruction counts the number of non-zero entries in s. Hence a K-sparse vector has L0 norm equal to K. The optimization in L0 norm can recover a K-sparse signal exactly with high probability using only M=K+1 i.i.d. Gaussian measurements. L1 norm is most successful and can exactly recover K-sparse signals and closely approximates compressible signals with high probability using only M>cK log(N/K) i.i.d. Gaussian measurements. L1 minimization tends to concentrate the energy of the signal on to a few non-zero coefficients unlike the least square (L2 minimization) which tends to spread the energy around. The L2 minimization is the classical solution for energy minimization. In various embodiments, any or a combination of the Lp minimization may be used that minimizes the error in signal recovery.

Figure 4:
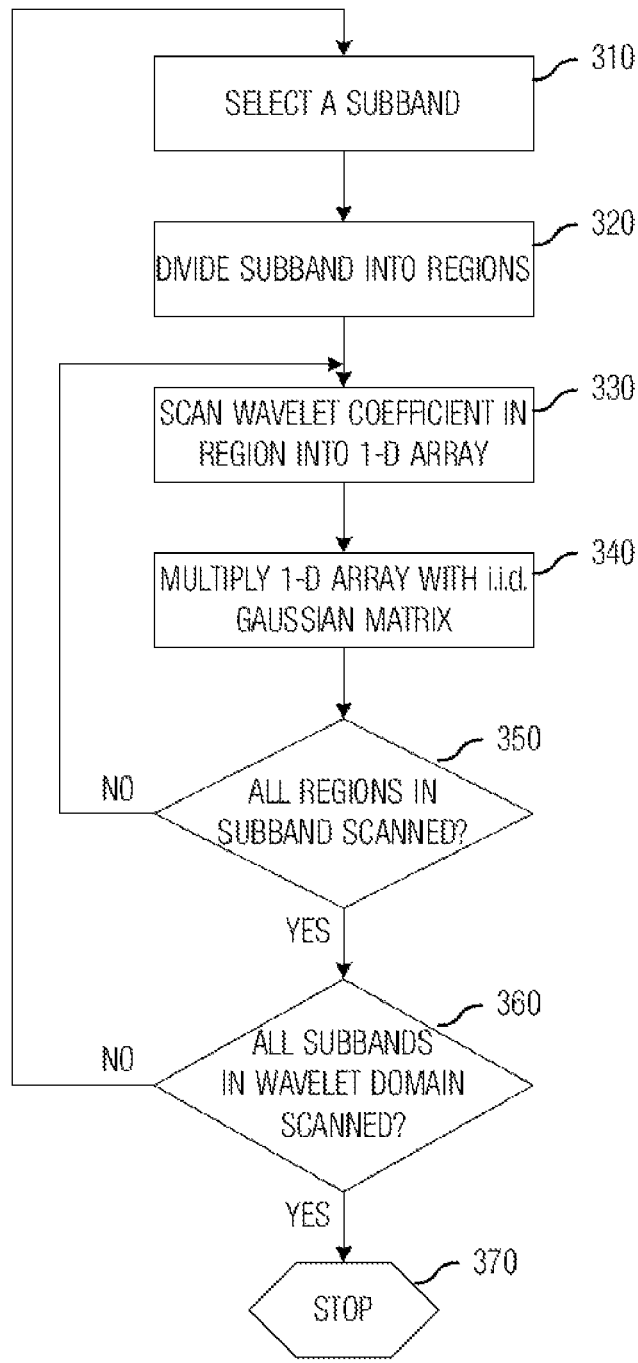
FIG. 4 describes a method for the compressive measurement for efficient sampling in the wavelet domain in accordance with an embodiment of the invention.

FIG. 4 describes a method for the compressive measurement for efficient sampling in the wavelet domain in accordance with an embodiment of the invention.

The wavelet transform decomposes a digital signal into a multiscale hierarchical representation, where the signal energy is highly concentrated into a few large wavelet transform coefficients. A statistical dependence at neighboring spatial locations at the same sub-band in the wavelet domain is observed, referred to as the clustering property.

In wavelet-based signal processing, locality, multiresolution, and compression (i.e., sparseness) are the three primary properties of wavelet transform. In addition, embodiments of the invention utilize secondary properties of the wavelet transform such as clustering and persistence. Clustering suggests that if a particular wavelet transform coefficient is large/small, then adjacent coefficients are very likely to also be large/small. Further, large/small values of wavelet transform coefficients tend to propagate across scales (persistence). For example, the wavelet transform coefficients for wavelet-based image processing can be modeled as a mixed Gaussian utilizing both the clustering and persistence properties.

Due to the energy compactness of wavelet transforms, most wavelet transform coefficients tend to be zero or close to zero, except few with large magnitude. Mathematically, wavelet transform coefficients obey a so-called "compressible" condition. Hence, the compressive sensing theory described above can be applied to wavelet transform coefficients.

With compressive sensing, non-adaptive measurements are taken on the signal (which in this case, are wavelet transform coefficients), with the number of measurements being far less than the dimensionality of the signal, and a recovery algorithm will reconstruct the original signal from these measurements.

In the measuring stage, as shown in box 310 (FIG. 4), each sub-band of the wavelet transform is measured individually and independently. A given sub-band is further divided into non-overlapping regions and compressive sensing measurements are taken on each region within the sub-band (box 320). The measured region could be of regular shape (for example, a 64 by 64 square in a two dimensional wavelet transform), or a directional shape that captures the object orientation. For each region, wavelet transform coefficients residing inside the region are scanned into a one dimensional array (box 330). Then the one dimensional array is multiplied to a compressive sensing admissible measurement matrix $\phi$, such as the i.i.d. Gaussian matrix (described above) (box 340). As shown in boxes 350 and 360, all measurements for regions of all sub-bands are collected similarly. This completes the measurement procedure (box 370).

Figure 5:
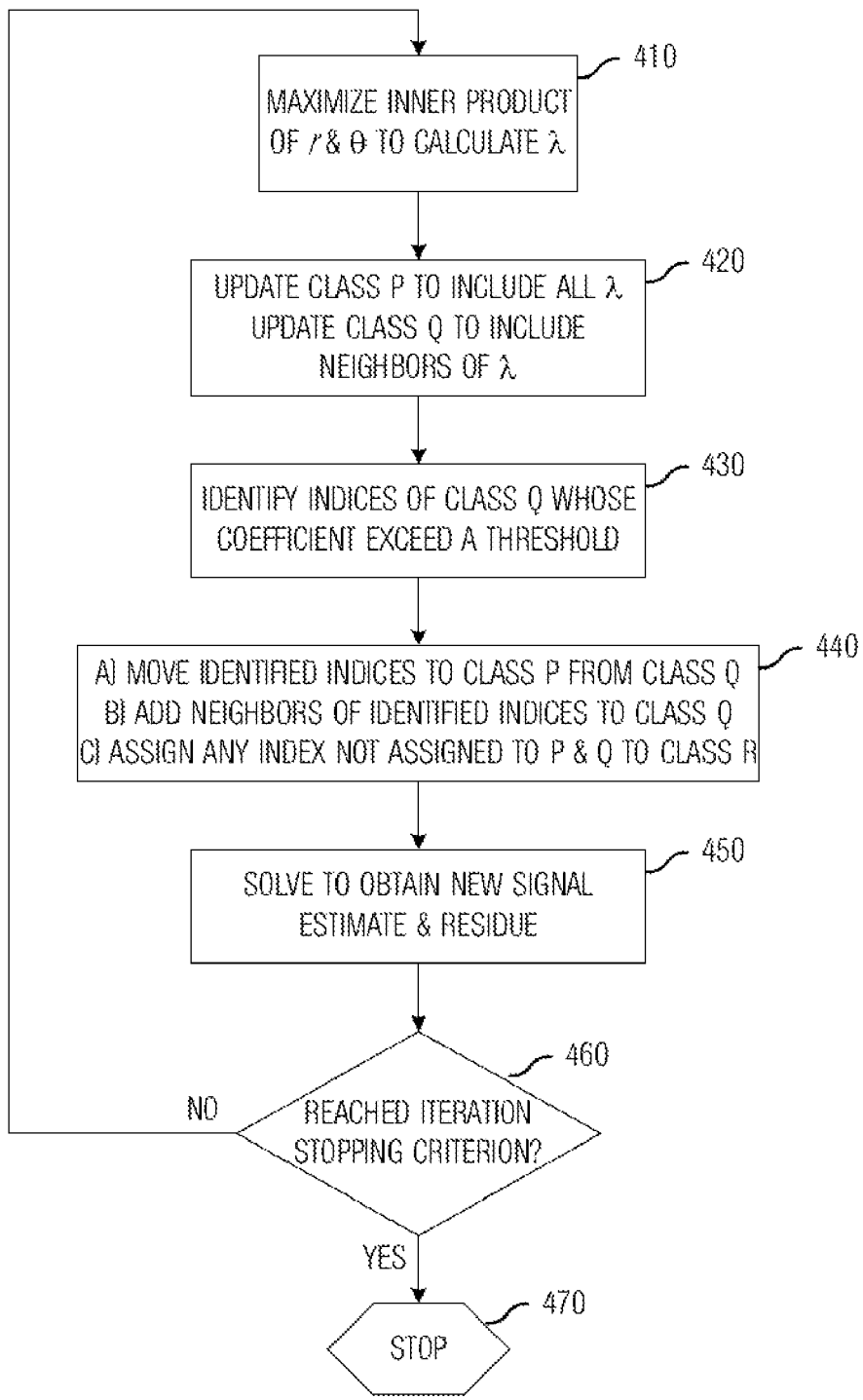
FIG. 5 describes a method for reconstruction of a signal from a compressively sampled signal in accordance with an embodiment of the invention.

FIG. 5 describes a method for reconstruction of a signal from a compressively sampled signal in accordance with an embodiment of the invention.

Embodiments of the invention use the measurements and reconstruct the original wavelet transform coefficients reliably and efficiently. In accordance with embodiments of the invention, the reconstruction method uses the clustering property of wavelet transform coefficients. In particular, the neighbors of large wavelet transform coefficients are examined. If one of such neighbor exceeds a predefined weighting threshold (instead of being the best match, i.e., the maximum point), such wavelet transform coefficients are selected at large as well and implemented in an orthogonal matching pursuit method as described in detail below.

The recovery method is performed on regions of each measured sub-band. For each region, all wavelet transform coefficients are classified into three non-overlapping classes.

A first class P is the collection of all significant wavelet transform coefficients, i.e., coefficients whose magnitude is larger than a given significance threshold. Any wavelet transform coefficient not above the significance threshold is termed to be an insignificant wavelet transform coefficient.

A second class Q is defined as the collection of all insignificant wavelet transform coefficients that have at least one significant neighbor. A third class R is defined as the collection of all insignificant wavelet transform coefficients that have no significant neighbor.

In various embodiments, the neighborhood of a wavelet transform coefficient can be defined as a regular shape (such as a 3 by 3 neighborhood in a two dimensional wavelet transform), or a directional shape that reflects the object orientation. In various embodiments, the neighbors to be examined (and neighborhood region) can be selected by any suitable criterion.

Assume the wavelet transform coefficients are listed as a one dimensional vector s, the admissible measurement matrix used in the $\theta$ measuring stage its columns by $\theta_1, \ldots, \theta_N$. Class P and class Q are both initialized to be empty, and class R is initialized to contain all wavelet transform coefficients for each region. The residual $r_0$ is initialized to the data vector v such that $v=\theta s$ and the iteration counter t is set to 1 i.e. t=1. The weighting threshold w is set, where w is a positive number between 0 and 1.

The algorithm picks columns in a greedy fashion. At each iteration, the column of $\theta$ that is most strongly correlated with the remaining part of the data vector v is chosen. This chosen column is subtracted off from the data vector v and iterated on the residual.

As illustrated in FIG. 5, the steps described below are repeated for each region in a sub-band of a wavelet domain until the signal is recovered.

In box 410, an index $\lambda$ is calculated that maximizes the inner product between the residue and the columns of the measure matrix. The index $\lambda$ is calculated as $\lambda=\arg\max_{j=1,\ldots,N}|(r_{t-1},\theta_j)|$.

In box 420, the class P is updated as $P=P\cup\{\lambda\}$. Hence, the class P includes all the coefficients with the calculated maximum index. Similarly, class Q is updated as Q=Q∪Neighbor$(\lambda)$\P. Subsequently, the class Q includes all coefficients that are the neighbors to the maximum index $\lambda$.

In box 430, the indices in class Q that exceed a weighting threshold is calculated as $E=\{j\in Q\||(r_{t-1},\theta_j)|\geq w\cdot|(r_{t-1},\theta_\lambda)|\}$. In this step, wavelet transform coefficients in the class Q are identified that are above a weighting threshold. The indices of these coefficients in the class Q are noted. The selected indices are included in the indices of the significant wavelet transform coefficients.

In box 440, the class P is updated as P=P∪E. Hence, class P now has the significant wavelet transform coefficients as selected in steps 420 and 430. Neighbors of newly assigned significant wavelet transform coefficients are assigned to class Q. Hence, the wavelet transform coefficients which have class P coefficients as neighbors are included into class Q. Hence, class Q is updated as Q=Q∪Neighbor(E)\P. The remaining wavelet transform coefficients (wavelet transform coefficients with no significant neighbor or significant by itself) forms class R. Hence, class R is calculated as the complement of what remains after identifying classes P and Q. Thus, $R=(P\cup Q)^c$.

In box 450, a least squares problem is solved to obtain a new signal estimate and the residue is updated. In various embodiments, the least square problem is solved for the submatrix $\theta_s$, whose columns are taken from $\theta$, according to the index class P. $s_t=\arg\min_s\|v-\phi_s s\|_2$. The new residue is calculated as $r_t=v-a$ wherein $a=\theta_p s_t$.

In box 460, the iteration counter t is updated such that t=t+1 and returns to step 410 if the iteration stopping criteria is not met. The iteration stopping criteria could be an error measurement (such as the value of $s_t$), the cardinal of Class P, etc., or combinations of several conditions.

When the iteration terminates (box 470), the approximation signal (a) is the reconstructed one dimensional array for the given region. After all regions of all sub-bands are recovered, the wavelet domain representation is fully restored. As large wavelet transform coefficients tend to cluster together, advantageously, the method converges fast, which leads to signal reconstruction with less iteration. In various embodiments, clustering properties of wavelet transform coefficients are used to identify indices of the submatrix $\theta_s$. Embodiments of the invention define the significance of a wavelet transform coefficient as either being larger than a significance threshold, or being larger than a weighting threshold if it has a significant neighbor. Advantageously, embodiments of the invention include the impact of a significant neighbor.

Embodiments of the invention apply compressive sensing measurements on regions of a wavelet sub-band. Conventional methods either apply compressive sensing measurements for all wavelet transforms coefficients of all sub-bands, or for all wavelet transform coefficients of one sub-band. Conventional methods do not use region-wide measurement in each wavelet sub-band.

Although the present invention and its advantages have been described in detail, it should be understood that various changes, substitutions and alterations can be made herein without departing from the spirit and scope of the invention as defined by the appended claims For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of signal processing, the method comprising:
   dividing, by a processor, a given sub-band of a wavelet transform of a signal into non-overlapping regions;
   measuring, by a processor, the wavelet transform coefficient residing inside each of the non-overlapping regions; and
   sending a data packet comprising the measured wavelet transform coefficients to a device, the measured wavelet transform coefficients configured to be used to reconstruct the signal in accordance with a spatial clustering property of the wavelet transform coefficients, wherein the spatial clustering property corresponds to a statistical correlation between the magnitudes of wavelet transform coefficients positioned at neighboring spatial locations in a wavelet domain of the signal.

2. The method of claim 1, further comprising:
   assigning the measured wavelet transform coefficient into a measurement array;
   multiplying the measurement array with an independent and identically distributed (i.i.d.) Gaussian matrix to obtain a multiplied measurement array; and
   communicating the multiplied measurement array in the data packet.

3. The method of claim 1, wherein the processor comprises a digital signal processor.

4. The method of claim 1, wherein the processor comprises a processor on a network server.

5. The method of claim 1, wherein the processor comprises a processor on a communications server.

6. The method of claim 1, wherein the wavelet transform is a discrete wavelet transform.

7. The method of claim 1, wherein the data packet is wirelessly transmitted at least in part of its route from a first network gateway server to a second network gateway server.

8. An apparatus comprising:
   a processor; and
   a non-transitory computer readable storage medium storing a computer program for execution by the processor, the computer program including instructions to:
   divide a given sub-band of a wavelet transform of a signal into non-overlapping regions;
   measure the wavelet transform coefficient residing inside each of the non-overlapping regions; and
   send a data packet comprising the measured wavelet transform coefficients to a device, the measured wavelet transform coefficients configured to be used to reconstruct the signal in accordance with a spatial clustering property of the wavelet transform coefficients, wherein the spatial clustering property corresponds to a statistical correlation between the magnitudes of wavelet transform coefficients positioned at neighboring spatial locations in a wavelet domain of the signal.

9. The apparatus of claim 8, wherein the computer program further includes instructions to:
   assign the measured wavelet transform coefficient into a measurement array;
   multiply the measurement array with an independent and identically distributed (i.i.d.) Gaussian matrix to obtain a multiplied measurement array; and
   communicate the multiplied measurement array in the data packet.

10. The apparatus of claim 8, wherein the processor comprises a digital signal processor.

11. The apparatus of claim 8, wherein the processor comprises a processor on a network server.

12. The apparatus of claim 8, wherein the processor comprises a processor on a communications server.

13. The apparatus of claim 8, wherein the wavelet transform is a discrete wavelet transform.

14. The apparatus of claim 8, wherein the data packet is wirelessly transmitted at least in part of its route from a first network gateway server to a second network gateway server.

15. A computer program product comprising a non-transitory computer readable storage medium storing a computer program, the computer program including instructions to:
   divide a given sub-band of a wavelet transform of a signal into non-overlapping regions;
   measure the wavelet transform coefficient residing inside each of the non-overlapping regions; and
   send a data packet comprising the measured wavelet transform coefficients to a device, the measured wavelet transform coefficients configured to be used to reconstruct the signal in accordance with a spatial clustering property of the wavelet transform coefficients, wherein the spatial clustering property corresponds to a statistical correlation between the magnitudes of wavelet transform coefficients positioned at neighboring spatial locations in a wavelet domain of the signal.

16. The computer program product of claim 15, wherein the computer program further includes instructions to:
   assign the measured wavelet transform coefficient into a measurement array;
   multiply the measurement array with an independent and identically distributed (i.i.d.) Gaussian matrix to obtain a multiplied measurement array; and
   communicate the multiplied measurement array in the data packet.

17. The computer program product of claim 15, wherein the wavelet transform is a discrete wavelet transform.

18. The computer program product of claim 15, wherein the data packet is wirelessly transmitted at least in part of its route from a first network gateway server to a second network gateway server.

* * * * *